United States Patent

Yokoyama et al.

[11] Patent Number: 5,676,318
[45] Date of Patent: Oct. 14, 1997

[54] METHOD OF RECOVERING VALUABLE SUBSTANCES FROM PRINTED CIRCUIT BOARD

[75] Inventors: Sadahiko Yokoyama; Masatoshi Iji, both of Tokyo, Japan

[73] Assignee: NEC Corporation, Tokyo, Japan

[21] Appl. No.: 400,769

[22] Filed: Mar. 8, 1995

[30] Foreign Application Priority Data

| Mar. 9, 1994 | [JP] | Japan | 6-038130 |
| Mar. 14, 1994 | [JP] | Japan | 6-042184 |

[51] Int. Cl.$^6$ ............................................... B02C 7/00
[52] U.S. Cl. .................. 241/24.14; 241/79.1; 241/80; 241/121; 451/28
[58] Field of Search ...................... 457/28, 87, 88, 457/453, 908; 241/24.14, 79.1, 80, 121, 119

[56] References Cited

U.S. PATENT DOCUMENTS

| 3,885,744 | 5/1975 | Drage | 241/24.14 |
| 3,905,556 | 9/1975 | Drage | 241/24.14 |
| 3,945,575 | 3/1976 | Marsh | 241/20 |
| 4,652,433 | 3/1987 | Ashworth et al. | 423/112 |
| 4,747,547 | 5/1988 | Harada | 241/24.14 |
| 4,865,642 | 9/1989 | Huddleston | 75/3 |
| 4,943,368 | 7/1990 | Gilbert et al. | 209/2 |
| 5,133,505 | 7/1992 | Bourcier et al. | 241/24.14 |
| 5,381,968 | 1/1995 | Lohnherr et al. | 241/80 |
| 5,386,619 | 2/1995 | Wark | 241/80 |

FOREIGN PATENT DOCUMENTS

| 231578 | 1/1986 | Germany | 241/24.14 |
| 63-276509 | 11/1988 | Japan. | |
| 2-88725 | 3/1990 | Japan. | |
| 1738361 | 6/1992 | Russian Federation | 241/24.14 |

OTHER PUBLICATIONS

"Recycling of Printed Wiring Board Waste," by S. Yokoyama et al., Proceedings of the 1993 IEEE/Tsukuba International Workshop on Advanced Robotics, Nov. 8-9, 1993, pp. 55–58.

"Unique Reinforcement/Additive From Recycled Circuit Boards" by L. K. Rosett et al., Plastics Compounding, Nov./Dec. 1983, pp. 47 and 48, 51–53.

*Primary Examiner*—Eileen P. Morgan
*Attorney, Agent, or Firm*—Foley & Lardner

[57] ABSTRACT

In a method of grinding a printed circuit board, a printed circuit board having various parts mounted thereon, or a residual ground product produced in the manufacturing process for the boards, and recovering valuable substances by separating the ground product into a portion containing a large amount of metal component such as copper and a portion consisting a resin, a filler material, and the like through a separation step, the separation step includes a specific gravity separation step of separating the ground product into a portion containing a large amount of substance having a high specific gravity and a portion containing a large amount of substance having a low specific gravity, and an electrostatic separation step of separating the ground product into a portion having a large amount of conductor and a portion containing large amount of insulator. The grinding step includes a coarse grinding step and a fine grinding step.

2 Claims, 1 Drawing Sheet

FIGURE
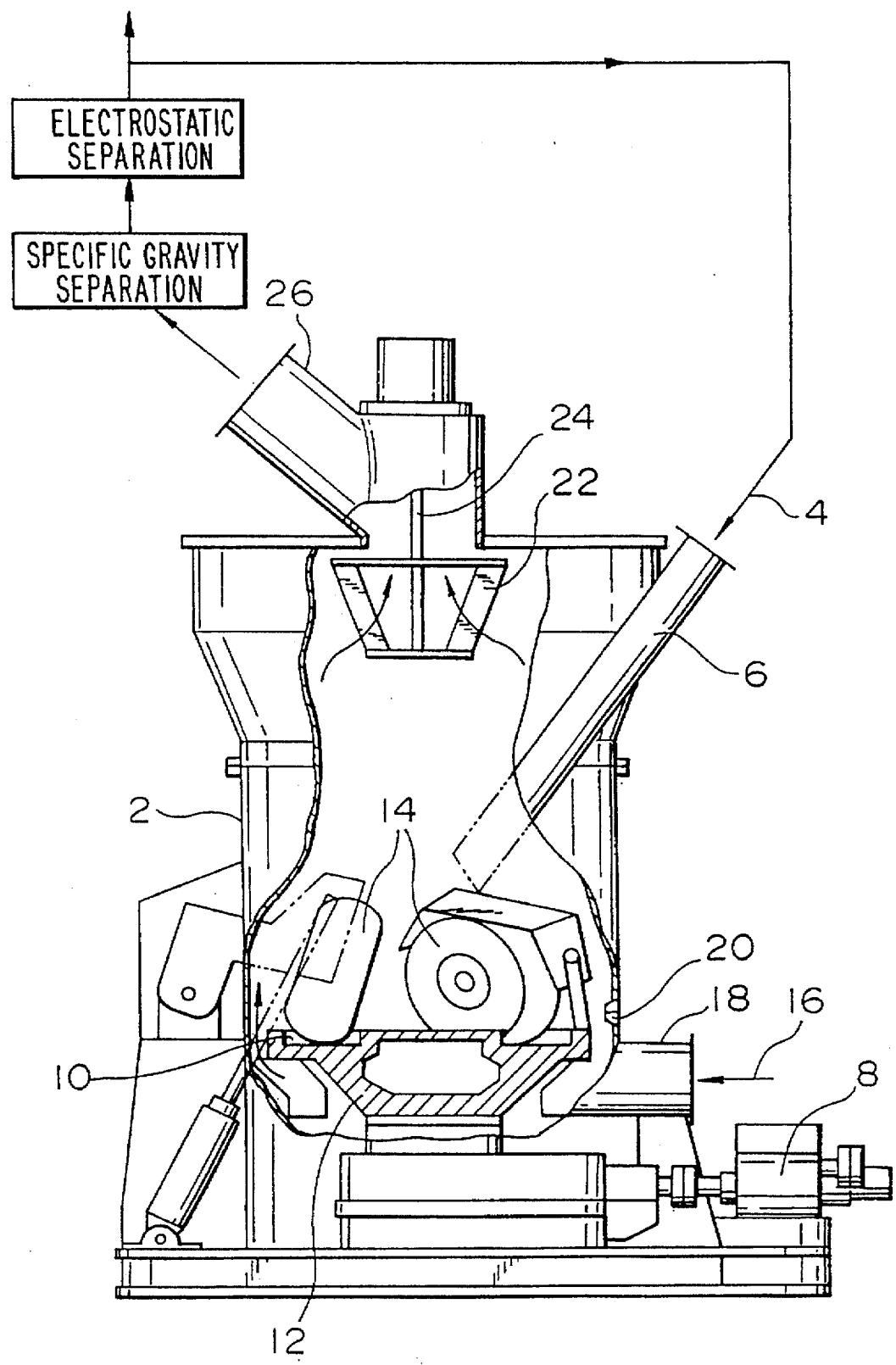

METHOD OF RECOVERING VALUABLE SUBSTANCES FROM PRINTED CIRCUIT BOARD

BACKGROUND OF THE INVENTION

1. Field of the Invention

The present invention relates to a method of grinding printed circuit boards and printed circuit boards having parts mounted thereon, which are used for electric devices, and residual molded portions such as frame members produced in the manufacturing processes for these boards, and separating and recovering the ground products into metals such as copper and other components such as resins and filler materials through a separation step including a specific gravity separation step and an electrostatic separation step.

2. Description of the Prior Art

As a conventional method of recycling printed circuit boards consisting of filler materials, resins, and metals as main components and printed circuit boards having electronic parts mounted thereon (to be referred to as parts-mounted boards hereinafter), a method of recovering thermal energy by incinerating these boards has been put into practice. As a method of recovering valuable substances from composite materials such as printed circuit boards, a method of separating and recovering valuable substances such as copper from these composite materials after heating and carbonizing resin components in the materials is available (Japanese Patent Laid-Open No. 2-88725). In addition, a reclamation method is disclosed in Japanese Patent Laid-Open No. 63-276509. In this method, a waste composite material consisting of a resin and a metal is ground after it is cooled to a temperature below the brittle temperature of the resin, and the metal and the resin are separated by using magnetic force.

In the conventional recycling method and valuable substance recovery method of processing printed circuit boards and parts-mounted boards by incineration and carbonization, since various waste gases are produced, advanced waste gas processing facilities must be installed. Furthermore, valuable substances contained in printed circuit boards and parts-mounted boards tend to be oxidized. As a result, the additional values in recovery may decrease. As another recycling method, a method of etching copper and the like on parts-mounted boards may be employed. This method, however, is not practical because large-scale facilities are required for drainage and recovery of copper. In the reclamation method for a waste composite material consisting of a resin and a metal, disclosed in Japanese Patent Laid-Open No. 63-276509, the following problems are posed. First, large refrigeration facilities which consume great energy are required. Second, in this technique, since a metal and a resin are separated from each other by using magnetic force, a nonmagnetic metal such as copper or aluminum cannot be separated and recovered.

As described above, establishment of a method of separating/recovering valuable substances such as metals from printed circuit boards and parts-mounted boards, and residual molded portions produced in the manufacturing processes for these boards has been an important subject.

SUMMARY OF THE INVENTION

The present invention has been made in consideration of the above situation, and has as its object to provide a method of recovering valuable substances from printed circuit boards and printed circuit boards having electronic parts mounted thereon.

In order to achieve the above object, according to the first aspect of the present invention, there is provided a method of recovering valuable substances from a printed circuit board, wherein a printed circuit board, a parts-mounted board having various parts mounted thereon, or a residual molded portion produced in a manufacturing process for the boards is ground, and valuable substances are recovered by separating an obtained ground product into a portion containing a large amount of metal such as copper and a portion consisting of a resin, a filler material, and the like through a separation step, the separation step including the specific gravity separation step of separating the ground product into a portion containing a large amount of substance having a high specific gravity and a portion containing a large amount of substance having a low specific gravity, and the electrostatic separation step of separating the ground product into a portion containing a large amount of conductor and a portion containing a large amount of insulator.

According to the second aspect of the present invention, there is provided a method of recovering valuable substances from a printed circuit board, wherein a printed circuit board, a parts-mounted board having various parts mounted thereon, or a residual molded portion produced in a manufacturing process for the boards is ground, and valuable substances are recovered by separating an obtained ground product into a portion containing a large amount of metal such as copper and a portion consisting of a resin, a filler material, and the like through a separation step, the separation step including the specific gravity separation step of separating the ground product into a portion containing a large amount of substance having a high specific gravity and a portion containing a large amount of substance having a low specific gravity, and the electrostatic separation step of separating the portion containing a large amount of substance having a high specific gravity which portion is separated by the specific gravity separation step into a portion containing a large amount of conductor and a portion containing a large amount of insulator.

According to the third aspect of the present invention, there is provided a method of recovering valuable substances from a printed circuit board, comprising the coarse grinding step of coarsely grinding a printed circuit board, a printed circuit board having various parts mounted thereon, or a residual molded portion produced in a manufacturing process for the boards, the fine grinding step of finely grinding a coarse ground product obtained by the coarse grinding step, and the separation step of separating the fine ground product obtained by the fine grinding step into a portion containing a large amount of metal component such as copper and a portion consisting of a resin, a filler material, or the like, wherein the fine grinding step includes the fine grinding step of finely grinding the coarse ground product by applying external forces including compressing and shearing forces thereto, and the separation step includes the specific gravity separation step of separating the ground product into a portion containing a large amount of substance having a high specific gravity and a portion containing a large amount of substance having a low specific gravity, and the electrostatic separation step of separating the fine ground product into a portion containing a large amount of conductor and a portion containing a large amount of insulator.

According to the fourth aspect of the present invention, there is provided a method of recovering valuable substances from a printed circuit board, comprising the coarse grinding step of coarsely grinding a printed circuit board, a printed circuit board having various parts mounted thereon, or a residual molded portion produced in a manufacturing process for the boards, the fine grinding step of finely grinding a coarse ground product obtained by the coarse grinding step, and the separation step of separating the fine ground product obtained by the fine grinding step into a portion containing a large amount of metal component such as copper and a portion consisting of a resin, a filler material, or the like, wherein the fine grinding step includes the fine grinding step of finely grinding the coarse ground product by applying external forces including compressing and shearing forces thereto, and the separation step includes the specific gravity separation step of separating the ground product into a portion containing a large amount of substance having a high specific gravity and a portion containing a large amount of substance having a low specific gravity, and the electrostatic separation step of separating the portion having a large amount of substance having a high specific gravity which portion is separated by the specific gravity separation step into a portion containing a large amount of conductor and a portion containing a large amount of insulator.

The average particle sizes of a ground product and a fine ground product obtained in the grinding step and the fine grinding step according to the second and third aspects of the present are not less than 0.03 mm and less than 1.0 mm.

The printed circuit board, the parts-mounted board, or the residual molded portion produced in the manufacturing process for the boards in the present invention is normally used for an electric device. The printed circuit board consists of a resin component, a filler material, and a metal component such as a circuit. Examples of the resin include epoxy resins, phenolic resins, polyimide resins, or the like. Examples of the filler material include glass fiber, paper, carbon fiber, or the like. Examples of the metal include copper, aluminum, iron, nickel, solder (tin and lead), or the like. The parts-mounted board is a board obtained by mounting electronic parts such as IC packages on the above printed circuit board. Note that the parts-mounted board includes a board obtained by removing some or all of the electronic parts from a printed circuit board. The residual molded portion includes a frame member produced in the process of manufacturing a printed circuit board, a defective copper-clad prepreg, thermoset portions of these members, and the like. The residual molded portion consists of almost the same components as those of a printed circuit board as a product.

The present invention is constituted by the grinding step of grinding a printed circuit board, a printed circuit board having parts mounted thereon, or a residual molded portion produced in the manufacturing process for the boards, and the separation step including the specific gravity separation step and the electrostatic separation step and serving to separate/recover the obtained ground product into a metal component and other components such as a resin and a filler material. Although the specific gravity separation step and the electrostatic separation step are indispensable to the separation step, other separation steps may be included before or after these steps.

In the fine grinding step in the present invention, a grinder having a grinding mechanism for finely grinding a substance (to be ground) by applying external forces including compressing and shearing forces thereto is used. For example, a grinder having a mechanism for clamping a substance (to be ground) between a groove portion formed in a rotating grinding table in the circumferential direction and a hydraulically pressed grinding roller, and grinding the substance by applying external forces including compressing and shearing forces is preferably used. In addition, in order to obtain a ground product having an optimal particle size for separation through the fine grinding step, a grinder having a powder recovery mechanism capable of controlling the particle size during a fine grinding step is preferable. As this powder recovery mechanism, a powder recovery mechanism including the step of blowing a fine ground product upward with an air current and the step of recovering only a fine ground product having a predetermined particle size or less is exemplified. A powder recovery mechanism which has a mechanism for blowing upward a ground product above the grinding mechanism with an air current, and a mechanism, arranged above the grinding mechanism, for recovering only a ground product having a predetermined particle size or less by rotating a plurality of classification blades is preferably used. In the fine grinding step in the present invention, a grinder having the above grinding mechanism and powder recovery mechanism is preferably used. As this grinder, for example, a grinder (to be referred to as a roller mill with a rotating blade type classification unit hereinafter) available from Ishikawajima-Harima Heavy Industries Co., Ltd. is available, which has a classification unit arranged above a roller mill and including a mechanism for recovering only a ground product having a predetermined particle size or less by rotating a rotating shaft having a plurality of classification blades.

FIG. 1 is a partially sectional front view schematically showing an embodiment of the above roller mill with a rotating blade type classification unit. This roller mill comprises a charge pipe 6 which is arranged on a side wall portion of a body casing 2 and into which a substance 4 to be ground is charged, a grinding table 12 which is rotated by a motor 8 and has a groove portion 10 in the circumferential direction, a plurality of grinding rollers 14 hydraulically pressed against the groove portion 10, an air supply port 18 and a blowing nozzle 20 to which air 16 for producing an ascending air current in the casing 2 is supplied, a rotating shaft 24 having a plurality of classification blades 22 arranged above the grinding rollers 14 (these members 18, 20, 22, and 24 constitute the classification unit), and a discharge pipe 26 for discharging only a ground product having a predetermined particle size or less to the outside. Note that the discharge pipe 26 may serve as an air suction port to always draw air.

In this roller mill with the rotating blade type classification unit, first of all, the grinding table 12 is rotated, and the grinding rollers 14 are hydraulically pressed against the grinding table 12. The substance 4 is ground between the groove portion 10 on the grinding roller 12 and the grinding rollers 14, and the ground product flows to the outer periphery of the grinding table 12. The ground product carried by an air current ascending from the outer periphery of the grinding table 12 is classified by the classification unit above the table and extracted together with the air current. A coarse ground product having a predetermined particle size or more is returned to the grinding table 12 and repeatedly ground together with the substance 4.

In the fine grinding step described above, the roller mill incorporating the rotating blade type classification unit is used. However, this fine grinding step may use a grinding method of a closed circuit scheme, in which a rotating blade type classification unit is arranged outside a general roller mill.

The separation step in the present invention uses a specific gravity separator for separating a ground product into a portion containing a large amount of substance having a high specific gravity, e.g., a metal, and a portion containing a large amount of substance having a low specific gravity, e.g., a resin or a filler material, and an electrostatic separator for separating a ground product into a portion containing a large amount of conductor and a portion containing a large amount of insulator such as a resin or a filler material. As the specific gravity separator, for example, a classification unit for performing classification by means of circulation of an air current (to be referred to as an air current centrifugal classification unit hereinafter) or a classification unit for performing classification by means of mechanical rotation of a classification rotor (to be referred to as a rotation centrifugal classification unit hereinafter) is preferably used. As the electrostatic separator, for example, an electrostatic classification unit using both static electricity and corona discharge (to be referred to as a composite type electrostatic classification unit hereinafter) is preferably used.

In the separation step according to the second and fourth aspects of the present invention, first of all, a ground product of a printed circuit board or parts-mounted board is separated into a ground product containing a large amount of metal having a high specific gravity such as copper and a ground product consisting of a substance having a low specific gravity such as a resin or filler material through the specific gravity separation step. Subsequently, the ground product containing a large amount of substance having a high specific gravity, obtained through the specific gravity separation step, is separated into a ground product containing a large amount of metal as a conductor such as copper and a ground product containing a large amount of insulator such as a resin or filler material. Note that if the ground product consisting of a resin, a filler material, or the like, separated through the electrostatic separation step, is returned to the specific gravity separation step after it is ground to a predetermined particle size again, the metal separation efficiency can be improved.

If a printed circuit board is finely ground by applying external forces including compressing and shearing forces to the board in the fine grinding step in the present invention, a metal such as copper is not easily ground finely, and a resin, a filler material, or the like is easily ground finely, as compared with the fine grinding step using a grinder having a grinding mechanism other than that described above. Therefore, according to the separation step in the present invention, a printed circuit board can be separated into a portion containing a metal such as copper at a very high content and a portion consisting of a resin, a filler material, or the like containing almost no metal. In addition, in the fine grinding step in the present invention, the wear resistance and the durability of the apparatus are much higher than those in the fine grinding step using a grinder having a grinding mechanism other than that described above.

In the separation step in the present invention, if the average particle size of a fine ground product of a printed circuit board or a parts-mounted board is excessively large, a metal such as copper and a resin do not peel from each other at this interface sufficiently. As a result, the separation ratio between the metal and other components decreases. In contrast to this, if the average particle size is excessively small, a metal is ground to an excessively fine powder. As a result, the difference in physical property between a metal as a conductor having a high specific gravity and a resin or filler material as an insulator having a low specific gravity does not effectively work for separation, resulting in a decrease in separation ratio. For this reason, the average particle size of a fine ground product of a printed circuit board or partsmounted board is preferably set to be equal to or larger than 0.03 mm (30 μm) and less than 1.0 mm (1,000 μm).

When a ground product of a printed circuit board or parts-mounted board is separated through the above separation step, a ground product containing a large amount of metal such as copper and a ground product containing a large amount of resin or filler material such as glass fiber can be separated/recovered. Especially, by grinding a printed circuit board or the like through the coarse grinding step and the fine grinding step, separation/recovery can be efficiently performed.

A metal such as copper separated in this manner has not oxidized unlike a metal separated by incineration. Therefore, such a metal can be used as a metal resource having a high additional value. The remaining ground product of a resin or a filler material such as glass fiber contains almost no metal such as copper as an impurity. For this reason, such a ground product can be effectively used as a filler material for a building, structural material, or the like.

The above and other advantages, features and additional objects of the present invention will become manifest to those versed in the art upon making reference to the following detailed description and accompanying drawings in which preferred embodiments incorporating the principle of the present invention are shown by way of illustrative example.

BRIEF DESCRIPTION OF THE DRAWINGS

FIG. 1 is a partially sectional front view of a grinder for performing a fine grinding step in a method of the present invention.

DETAILED DESCRIPTION OF PREFERRED EMBODIMENT

The present invention will be described below with reference to several preferred embodiments.

As samples, the following boards were used: a printed circuit board (composition: 30 wt % copper; 20 wt % glass fiber; 50 wt % epoxy) consisting of glass-fiber reinforced epoxy (to be abbreviated to glass epoxy hereinafter) and having a copper pattern; a board obtained by applying a solder on the copper pattern of the above printed circuit board; a printed circuit board (composition: 30 wt % copper; 20 wt % paper; 50 wt % phenolic resin) consisting of paper-phenolic resin (to be abbreviated to paper phenol hereinafter) and having a copper pattern; and a board obtained by mounting electronic parts such as IC packages and connectors on the above glass epoxy board having the copper pattern (to be abbreviated to a parts-mounted board; composition: 33 wt % copper, and other components such as epoxy, glass fiber, and silica). Each board was ground to a predetermined particle size by a shear and impact grinder, and the ground product having undergone the grinding step was used in a separation step in the present invention. The weight of each sample used was 10 kg. As the shear and impact grinder, a hammer mill for grinding a substance by using a rotating hammer, a bed knife in a chamber, and a screen at a discharge portion, or a disk mill for grinding a substance by using pins or grooves of opposing rotating disks is available.

Tables 1 to 3 show Examples 1 to 9 associated with the first and second aspects of the present invention. Table 4 shows Comparative Examples 1 and 2. Each table shows the conditions for grinding and separation, the copper content of a powder containing a large amount of copper (to be referred to as a copper-rich powder hereinafter) which is finally obtained through a grinding step and a separation step, and the copper recovery ratio. The copper recovery ratio is the ratio of the copper content in each copper-rich powder to the total amount of copper contained in the printed circuit board.

In a separation step in each example, an air current centrifugal classification unit or rotation centrifugal classification unit was used in a specific gravity separation step, and a composite type electrostatic separator was used in an electrostatic separation step. Each example used a method of grinding a ground product which contained large amounts of filler material and resin as insulators, and was obtained through an electrostatic separation step, to a predetermined particle size again, and performing the initial separation step again.

In a separation step in each comparative example, the above air current centrifugal classification unit and composite type electrostatic separator were independently used.

The condition for specific gravity separation performed by the specific gravity separator was set such that the weight ratio of a ground product having a high specific gravity to a ground product having a low specific gravity was 50:50. The specific gravity separator was adjusted for each ground product in accordance with this weight ratio. As the air current centrifugal classification unit, a unit having a standard throughput of 5 kg/h was used. The air suction amount was adjusted in the range from 1 m³/min to 5 m³/min, and the wind velocity of secondary air was adjusted in the range from 10 m/s to 5 m/s, thereby setting the above specific gravity separation condition. As the composite type electrostatic separator, a unit having an average throughput of 120 kg/h was used. Five-stage electrostatic separation was performed while the applied voltage was set to 30 kV; and the rotational speed of the rotor, 80 r.p.m. In this five-stage electrostatic separation, five electrostatic separators were arranged in series, and a ground product which contained large amounts of insulators, and was separated by the electrostatic separator in each stage, was further separated by the electrostatic separator in the next stage.

Each of Examples 1 to 9 of the present invention is associated with a method of grinding printed circuit boards and printed circuit board having parts mounted thereon, which are used for electric devices, and residual molded portions such as frame members produced in the manufacturing processes for these boards, and separating and recovering the ground products into metals such as copper and other components such as resins and filler materials through a separation step including a specific gravity separation step and an electrostatic separation step. Of these examples, Examples 1 to 8 are associated with the second aspect of the present invention, which relates to a valuable substance separation/recovery method of performing a separation step such that an electrostatic separation step is performed after a specific gravity separation step with respect to a ground product containing large amounts of substances having high specific gravities.

In contrast to the examples of the present invention shown in Tables 1 to 3, Comparative Examples 1 and 2 shown in Table 4 are associated with a method of separating/recovering valuable substances from a printed circuit board, in which a separation step after a grinding step includes either a specific gravity separation step or an electrostatic separation step.

According to Examples 1 to 9 associated with the first and second aspects of the present invention, there is no need to install large-scale facilities such as advanced waste gas processing facilities required in a conventional valuable substance recovery method using incineration and carbonization. In addition, since valuable metal components contained in printed circuit boards and parts-mounted boards do not oxidize, they can be recovered as high-quality valuable substances. In these examples, since an electrostatic separation step is employed instead of a conventional separation step using magnetic force, nonmagnetic metals such as copper and aluminum, which are often used for the circuit portions of printed circuit boards, can also be separated/recovered. Furthermore, the copper content in the copper-rich powder in each example is higher than that in each comparative example shown in Table 4, in which the separation step includes either a specific gravity step or an electrostatic separation step. According to the present invention, the copper in the ground product of each printed circuit board is concentrated in the copper-rich powder, high-purity copper can be recovered.

The differences in separation/recovery effect between the examples owing to the different particle sizes of the ground products are observed by comparing Examples 1 to 6 with Examples 7 and 8. It is apparent from the copper contents and the copper recovery ratios in Tables 1 to 3 that the separation ratio between a metal such as copper and other components such as a resin decreases if the average particle size of a ground product is excessively large as in Example 7, or is excessively small as in Example 8. It is, therefore, apparent that Examples 1 to 6 of the present invention are excellent in terms of both copper content and copper recovery. That is, it is apparent that the average particle size of a ground product is preferably set to be equal to or larger than 0.03 mm (30 µm) and less than 1.0 mm (1,000 µm) as in Examples 1 to 6. As described above, high-purity copper can be recovered at a high recovery ratio. That is, this effect can be obtained in addition to the effects of the first and second aspects of the present invention.

TABLE 1

| Example No. | 1 | 2 | 3 |
|---|---|---|---|
| Type of Printed Circuit Board | glass epoxy | glass epoxy | *glass epoxy |
| Separators in Separation Steps | air current centrifugal classification unit ↓ composite type electrostatic separator | rotation centrifugal classification unit ↓ composite type electrostatic separator | air current centrifugal classification unit ↓ composite type electrostatic separator |
| Average Particle Size of Ground Product (mm) | 0.056 | 0.098 | 0.21 |
| Copper- Copper | 76 | 80 | 78 |

TABLE 1-continued

| Example No. | | 1 | 2 | 3 |
|---|---|---|---|---|
| Rich Powder | Content (wt %) Copper Recovery Ratio (wt %) | 93 | 96 | 95 |

(*copper pattern with solder)

TABLE 2

| Example No. | | 4 | 5 | 6 |
|---|---|---|---|---|
| Type of Printed Circuit Board | | paper phenol | parts-mounted board | parts-mounted board |
| Separators in Separation Steps | | rotation centrifugal classification unit ↓ composite type electrostatic separator | air current centrifugal classification unit ↓ composite type electrostatic separator | rotation centrifugal classification unit ↓ composite type electrostatic separator |
| Average Particle Size of Ground Product (mm) | | 0.033 | 0.46 | 0.95 |
| Copper-Rich Powder | Copper Content (wt %) | 75 | 77 | 75 |
| | Copper Recovery Ratio (wt %) | 95 | 92 | 89 |

TABLE 3

| Example No. | | 7 | 8 | 9 |
|---|---|---|---|---|
| Type of Printed Circuit Board | | parts-mounted board | paper phenol | *glass epoxy |
| Separators in Separation Steps | | rotation centrifugal classification unit ↓ composite type electrostate separator | air current centrifugal classification unit ↓ composite type electrostatic separator | composite type electrostatic separator ↓ air current centrifugal classification unit |
| Average Particle Size of Ground Product (mm) | | 1.3 | 0.022 | 0.46 |
| Copper-Rich Powder | Copper Content (wt %) | 65 | 68 | 82 |
| | Copper Recovery Ratio (wt %) | 63 | 61 | 58 |

(*copper pattern with solder)

TABLE 4

| Comparative Example No. | | 1 | 2 |
|---|---|---|---|
| Type of Printed Circuit Board | | glass epoxy | parts-mounted board |
| Separator in Separation Step | | air current centrifugal classification unit | composite type electrostatic classification unit |
| Average Particle Size of Ground Product (mm) | | 0.098 | 0.95 |
| Copper-Rich Powder | Copper Content (wt %) | 57 | 38 |
| | Copper Recovery Ratio (wt %) | 95 | 32 |

Tables 5 to 7 show Examples 10 to 18 associated with the third and fourth aspects of the present invention. Table 8 shows Comparative Examples 3 and 4. Each table shows the conditions for grinding and separation, the chromium concentration in a fine ground product obtained through a fine grinding step, the copper content of a powder containing a large amount of copper (to be referred to as a copper-rich powder hereinafter) which is finally obtained through a separation step, the copper recovery ratio, and the copper content in a powder containing filler materials such as a resin and glass fiber (to be referred to as a glass fiber/resin powder hereinafter) which is finally obtained through the separation step. In this case as well, the copper recovery ratio is the ratio of the copper content in each copper-rich powder to the total amount of copper contained in the printed circuit board.

Samples identical to those used in Examples 1 to 9 were used. As a grinder used in a coarse grinding step, a hammer mill as a type of shear and impact type grinder was used in the examples and the comparative examples. This mill has a mechanism of grinding a substance by using a rotating manner, a bed knife in a chamber, and a screen at a discharge portion. In this case, the mesh size of the screen was set to be 3 mm.

In each example, a fine grinding step was performed by using a method of grinding a substance by using a roller mill with a rotating blade type classification unit or a method of grinding a substance by a closed circuit scheme in which a rotating blade type classification unit is installed outside a roller mill, and a classified coarse powder from the classification unit is returned to the grinder (this method will be referred to as roller mill+rotating blade type classification unit (closed circuit scheme) hereinafter). The average particle size of each ground product was set by adjusting the rotational speed of each rotating blade type classification unit in the range from 50 r.p.m to 1,000 r.p.m; and the air suction amount in each roller mill, in the range from 5 m$^3$/min to 20 m$^3$/min.

As a grinder used in the fine grinding step in each comparative example, the above hammer mill or a disk mill as a type of shear and impact grinder having a mechanism of grinding a substance by using pins or grooves of opposing rotating disks was used.

Each of the grinders used in the examples and the comparative examples has a standard ability of grinding a 10 kg plastic material per hour. As a material for the grinding portion of each grinder in a coarse grinding step, general steel containing no chromium was used in the examples and the comparative examples. As a material for the grinding portion of each grinder in a fine grinding step, high-chromium-concentration cast iron containing 25 wt % chromium was used in not only the examples but also the comparative examples. The wear resistances of the fine grinders were compared with reference to the chromium concentrations in the respective fine ground products.

The classification units and separators used in the separation steps in Examples 10 to 18 and Comparative Examples 3 and 4 are the same as those in Examples 1 to 9 and Comparative Examples 1 and 2 described above. This applies to the conditions for specific gravity separation performed by the specific gravity separator. In addition, the composite type electrostatic separator used in these examples is the same as that in the above examples.

Each of Examples 10 to 18 of the present invention shown in Tables 5 to 7 is associated with a method of coarsely grinding printed circuit boards and printed circuit boards having parts mounted thereon, which are used for electric devices, and residual molded portions such as frame members produced in the manufacturing processes for these boards, by using a hammer mill, finely grinding the coarse ground products by applying external forces including a compressing force and a shearing force, and separating and recovering the fine ground products into metals such as copper and other components such as resins and filler materials through a separation step including a specific gravity separation step and an electrostatic separation step. Of these examples, Examples 10 to 17 are associated with the fourth aspect of the present invention, which relates to a valuable substance separation/recovery method of performing a separation step such that an electrostatic separation step is performed after a specific gravity separation step with respect to a ground product containing large amounts of substances having high specific gravities.

In contrast to Examples 10 to 17, Comparative Examples 3 and 4 shown in Table 8 are associated with a method of separating/recovering valuable substances from a printed circuit board, in which a separation step after a grinding step includes either a specific gravity separation step or an electrostatic separation step.

According to Examples 10 to 18 associated with the third and fourth aspects of the present invention, there is no need to install large-scale facilities such as advanced waste gas processing facilities required in a conventional valuable substance recovery method using incineration and carbonization. In addition, since valuable metal components contained in printed circuit boards and parts-mounted boards do not oxidize, they can be recovered as high-quality valuable substances. In these examples, since an electrostatic separation step is employed instead of a conventional separation step using magnetic force, nonmagnetic metals such as copper and aluminum, which are often used for the circuit portions of printed circuit boards, can also be separated/recovered. Furthermore, the copper content in the copper-rich powder in each example is as high as 75% or more, as compared with each comparative example shown in Table 8, in which the separation step includes either a specific gravity step or an electrostatic separation step. According to the present invention, since the copper in the ground product of each printed circuit board is concentrated in the copper-rich powder, high-purity copper can be recovered. On the other hand, the remaining glass fiber/resin powders contain almost no copper as an impurity. Therefore, the glass fiber/resin powders can be widely and effectively used as a structural material, a building material, and a filler material such as an insulating material. Furthermore, since the concentration of chromium, in a fine powder, which is produced because of friction on the grinder in each example of the present invention is extremely lower than that in each comparative example, the wear resistance in a fine grinding step can be improved by the present invention.

The differences in separation/recovery effect between the examples owing to the different particle sizes of the ground products are observed by comparing Examples 10 to 15 with Examples 16 and 17. It is apparent from the copper contents and the copper recovery ratios in Tables 5 to 7 that the separation ratio between a metal such as copper and other components such as a resin decreases if the average particle size of a ground product is excessively large as in Example 16, or is excessively small as in Example 17. It is, therefore, apparent that Examples 10 to 15 of the present invention are excellent in terms of both copper content and copper recovery, which are about 90% or more. That is, it is apparent that the average particle size of a ground product is preferably set to be equal to and larger than 0.03 mm (30 µm) and less than 1.0 mm (1,000 µm) as in Examples 10 to 15. As described above, high-purity copper can be recovered at a high recovery ratio. That is, this effect can be obtained in addition to the effects of the third and fourth aspects of the present invention.

TABLE 5

| Example No. | 10 | 11 | 12 |
|---|---|---|---|
| Type of Printed Circuit Board | glass epoxy | glass epoxy | *glass epoxy |
| Grinder in Fine Grinding Step | roller mill with rotating blade type classification unit | roller mill with rotating blade type classification unit | roller mill + rotating blade type classification unit (closed circuit scheme) |
| Separator in Separation Steps | air current centrifugal classification unit ↓ composite type electrostatic separator | rotation centrifugal classification unit ↓ composite type electrostatic separator | air current centrifugal classification unit ↓ composite type electrostatic separator |
| Average Particle Size of Fine Ground Product (mm) | 0.054 | 0.12 | 0.23 |
| Chromium Concentration in Fine Ground Product (ppm) | 19 | 14 | 29 |
| Copper-Rich Powder Copper Content (wt %) | 92 | 94 | 96 |
| Copper Recovery Ratio (wt %) | 96 | 97 | 98 |
| Copper Content in Glass Fiber/Resin Powder | 1.7 | 1.3 | 0.86 |

(*copper pattern with solder)

TABLE 6

| Example No. | 13 | 14 | 15 |
|---|---|---|---|
| Type of Printed Circuit Board | paper phenol | parts-mounted board | parts-mounted board |
| Grinder in Fine Grinding Step | roller mill with rotating blade type classification unit | roller mill with rotating blade type classification unit | roller mill + rotating blade type classification unit (closed circuit scheme) |
| Separator in Separation Steps | rotation centrifugal classification unit ↓ composite type electrostatic separator | air current classification unit ↓ composite type electrostatic separator | rotation centrifugal classification unit ↓ composite type electrostatic separator |
| Average Particle Size of Fine Ground Product (mm) | 0.031 | 0.47 | 0.98 |
| Chromium Concentration in Fine Ground Product (ppm) | 9 | 42 | 32 |
| Copper-Rich Powder Copper Content (wt %) | 93 | 93 | 89 |
| Copper Recovery Ratio (%) | 96 | 96 | 95 |
| Copper Content in Glass Fiber/Resin Powder | 1.7 | 2.0 | 2.5 |

TABLE 7

| Example No. | 16 | 17 | 18 |
|---|---|---|---|
| Type of Printed Circuit Board | parts-mounted board | paper phenol | *glass epoxy |
| Grinder in Fine Grinding Step | roller mill with rotating blade type classification unit | roller mill with rotating blade type classification unit | roller mill + rotating blade type classification unit (closed circuit scheme) |
| Separator in Separation Steps | air current centrifugal classification | rotation classification unit | composite type electrostatic |

TABLE 7-continued

| Example No. | 16 | 17 | 18 |
|---|---|---|---|
| | unit ↓ composite type electrostatic separator | ↓ composite type electrostatic separator | separator ↓ air current centrifugal classification unit |
| Average Particle Size of Fine Ground Product (mm) | 1.3 | 0.020 | 0.52 |
| Chromium Concentration in Fine Ground Product (ppm) | 21 | 11 | 30 |
| Copper-Rich Powder | Copper Content (wt %) | 79 | 83 | 91 |
| | Copper Recovery Ratio (wt %) | 76 | 78 | 69 |
| Copper Content in Glass Fiber/Resin Powder | 11 | 9.2 | 12 |

(*copper patten with solder)

TABLE 8

| Comparative Example No. | 3 | 4 |
|---|---|---|
| Type of Printed Circuit Board | glass epoxy | parts-mounted board |
| Grinder in Fine Grinding Step | hammer mill | disk mill |
| Separator in Separation Step | air current centrifugal classification unit | composite type electrostatic classification unit |
| Average Particle Size of Fine Ground Product (mm) | 0.098 | 0.95 |
| Chromium Concentration in Fine Ground Product (ppm) | 976 | 186 |
| Copper-Rich Powder | Copper Content (wt %) | 57 | 38 |
| | Copper Recovery Ratio (wt %) | 95 | 32 |
| Copper Content in Glass Fiber/Resin Powder (wt %) | 3.0 | 31 |

As is apparent from the above description, according to the present invention, since incineration and carbonization as in a conventional recovery method are not used, there is no need to install large-scale facilities such as advanced waste gas processing facilities. In addition, since valuable metal components contained do not oxidize, they can be recovered as high-quality valuable substances having high additional values. Furthermore, according to the present invention, a metal component in the ground product of each printed circuit board is concentrated in a powder containing a large amount of metal component which is finally obtained through a separation step after a grinding step, a high-purity metal component containing only a small amount of other components such as a resin can be recovered. On the other hand, the remaining ground products containing a filler material such as glass fiber and a resin contain almost no metal component as an impurity. Therefore, these powders can be effectively used as a structural material, a building material, and a filler material such as an insulating material. Moreover, the wear resistance in a fine grinding step in the present invention is very high, and the durability of each apparatus is high. This makes it possible to realize a practical plant.

In addition, a high-purity metal component can be recovered at a high recovery ratio from the ground product of a parts-mounted board. That is, this effect can be obtained in addition to the effects of the first to fourth aspects of the present invention.

According to the present invention, therefore, efficient separation/recovery of metals and other components from ground products of printed circuit boards, parts-mounted boards, and residual molded portions produced in the manufacturing processes for these boards, which has been difficult to realize, can be realized, and the recovered metals and other components can be effectively used as resources.

What is claimed is:

1. A method of recovering valuable substances from printed circuit board waste products, said method comprising the steps of:

(a) grinding said waste products into particles by passing said waste products between a work surface and a grinding roller while pressing said grinding roller toward said work surface to exert compressive and shearing forces on said waste products;

(b) separating said particles into particles larger than or equal to a predetermined size and particles smaller than said predetermined size;

(c) returning said particles larger than or equal to said predetermined size to the grinding process of step (a);

(d) separating said particles smaller than said predetermined size in a specific gravity separator into a first portion having a large amount of substance with high specific gravity and a second portion having a large amount of substance with low specific gravity;

(e) separating said first portion in an electrostatic separator into a third portion having a large amount of substance with good insulating characteristics and a fourth portion having a large amount of substance with good conductivity; and (f) returning said third portion to the grinding process of step (a).

2. A method according to claim 1, wherein said predetermined size is approximately 1.0 mm and wherein said grinding process of step (a) does not produce particles smaller than 0.03 mm.

* * * * *